United States Patent Office 3,555,476
Patented Jan. 12, 1971

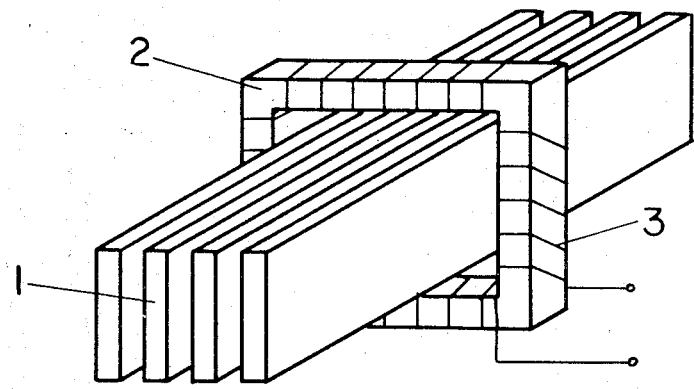
FIG.1
PRIOR ART
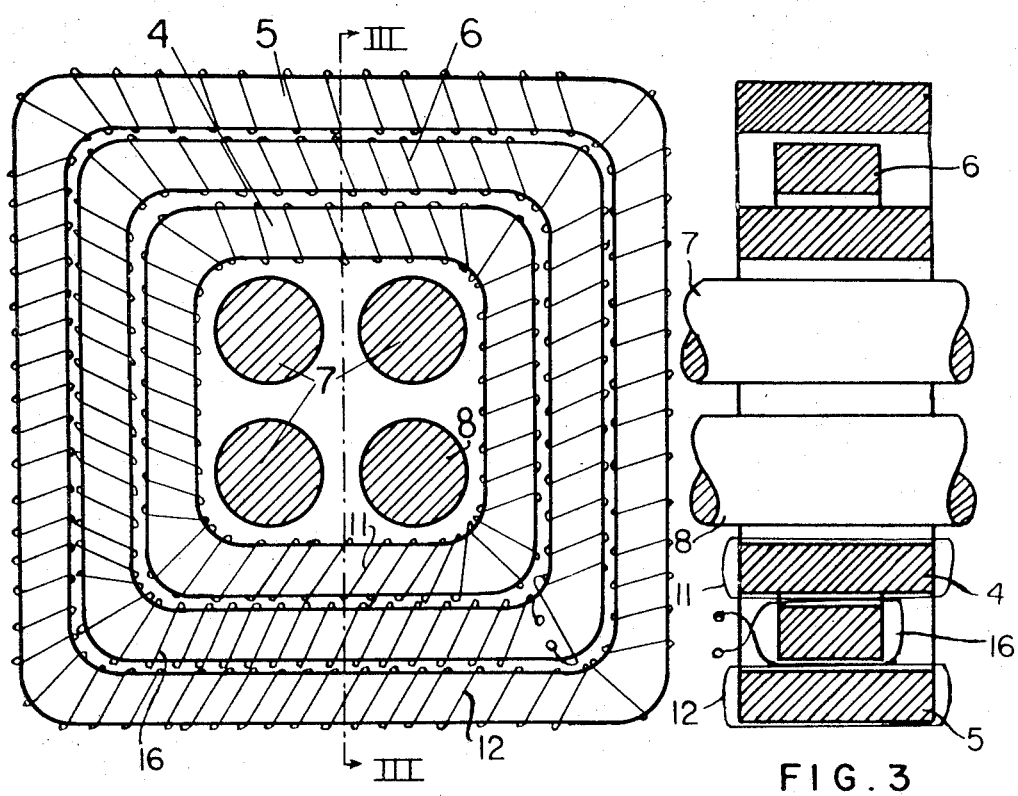
FIG.2
FIG.3
INVENTORS
MICHAEL B. BRENNEN
IAIN WEIR-JONES
*Gordon W. Telfer*
ATTORNEY

3,555,476
LEAKAGE CURRENT SENSOR
Michael B. Brenner, Wilkinsburg, Pa. (1100 Penn Center Blvd., Pittsburgh, Pa. 15235), and Iain Weir-Jones, Apt. 911, Rockview Towers, 1250 Ramsey View Court, Sudbury, Ontario, Canada
Filed Oct. 4, 1968, Ser. No. 765,750
Int. Cl. H01f 15/04, 27/28
U.S. Cl. 336—73   4 Claims

ABSTRACT OF THE DISCLOSURE

A leakage current sensor for detecting leakage currents to ground from the conductors of an electrical network having one or more phases, such as due to insulation deterioration, is provided wherein a first magnetic core surrounds the conductors and has one or more windings for current detection and initial premagnetization. A second magnetic core, also surrounding the conductors of the network, is located between the first, detection core and the conductors to shield against stray flux from the conductors. Preferably, also, a third magnetic core surrounds the detection core to shield against external stray fluxes. Both the second and third, or inner and outer, cores are shunted, i.e., have shorted turns therearound.

---

This invention concerns improvements in and relating to current detection and especially to means for monitoring the state of phase-insulation with respect to ground by means of detecting a zero sequence or leakage current which can be several orders of magnitude less than the phase currents of an electric network. It has for its object a multiple improvement in the signal to noise ratio, response and sensitivity of on-line insulation monitoring (core balance) devices, some telecommunication and known shock-protection equipment.

In known devices for detecting ground fault (earth leakage) of say, a 3-phase supply network (see FIG. 1), it is known to pass all the conductors 1 of the network supply cable through a core 2 of soft ferromagnetic material on which a detection winding 3 (search coil) is wound. If a common conductor is present, it must not be grounded on the load side of the detection ring. The detection ring is theoretically uninfluenced by the normal supply currents, whether balanced or unbalanced, but is affected when a fault develops on one line, the winding then operating an alarm or tripping a circuit breaker. Whilst this device is satisfactory under certain conditions, we find that it is unduly influenced by certain constructional and other features. Thus in a device of the kind described it is assumed that each of the three conductors is equally spaced from the ring and therefore influences the detection ring equally. This, in practice, is not the case, since one conductor is usually nearer the ring than the other two, the load on the network is never perfectly balanced and the phase currents are not equal. Thus, even by using a multi-core co-axial cable passing through the detection ring the detection winding picks up certain amounts of stray flux caused by phase currents of the cable and constantly produces a current of random phase and amplitude of supply and transient frequencies. The alarm or tripping device must therefore be set to operate above this current under normal conditions of supply.

The effect of stray flux becomes of even greater concern when establishing the alarm or trip values of ground fault currents for high current busworks. The trip value of fault current is generally larger than one percent of the normal phase currents and even for such a large fault current a several cycle safety trip delay is required in order to avoid nuisance tripping due to different transient phenomena of the power network inducing stray currents in detection winding 3.

Some examples of prior art that may be referred to are: U.S. Pat. 3,213,321 by Dalziel, Oct. 19, 1965; an article by R. A. Pfunter entitled "The Accuracy of Current Transformers Adjacent to High Current Buses," AIEE Transactions, 1951, v. 70, pages 1656–1662; an article by A. H. M. Arnold entitled "Leakage Phenomena in Ring Type Current Transformers," Institution of Electrical Engineers Journal, 1934, v. 7, pages 413–423; and an article by H. Diggle and E. R. Hartill entitled "Some Applications of the Electrolytic Tank for Engineering Design Problems," The Proceedings of the Institution, August 1954, pages 348–368.

The effect of stray flux around the phase conductors can be greatly reduced, in accordance with this invention, by applying inner ring 4 and outer ring 5 in addition to detection ring 6 as shown in FIGS. 2 and 3. Inner ring 4 eliminates the effect of stray flux generated by phase conductors 7 and common conductor 8. Outer ring 5 is necessary when an external magnetic field, for example from a nearby bus or cable, may unduly affect the detection ring. The detection ring 6 may be identical to the one shown in FIG. 1 and is placed between the aforesaid shunt rings 4 and 5 and spaced therefrom. The detection ring 6 has a detection winding 16 thereon. Each of the shunt cores 4 and 5 has one or more short circuited windings 11 and 12, respectively, surrounding it.

The shunt cores form a parallel magnetic circuit for the leakage current but their presence does not decrease the sensitivity of the detection ring if the source impedance of the leakage current is much greater than the impedance of the shunt rings. An equivalent of the transformed leakage current flows in all windings of the leakage current sensor. The stray currents which produce aforesaid stray fluxes in the area surrounded by shunt rings 4 and surrounding shunt ring 5 have relatively low equivalent source impedances. Any stray flux which enters one of the shunt rings finds an equivalent high reluctance magnetic path because the equivalent stray current in the shorted turn of the shunt ring produces a flux opposing the entering stray flux. Stray fluxes thus cannot penetrate and cannot saturate the shunt rings but they are diverted and forced to close in a path not reaching the detection ring. The shunt cores also provide some static shielding for the detection ring but such cores without having shorted turns on them tend to saturate and are effective for protecting the detection ring only from a relatively small amount of stray flux.

By eliminating the effect of stray fluxes the full sensitivity of the detection ring can be used, the signal to noise ratio improves and very low leakage currents can be accurately measured.

The accuracy of the current ratio of a current transformer is a function of the magnetic flux caused by the primary current in the core of the transformer. This alternating magnetic flux induces a voltage in the secondary (detection coil) of the current transformer. The secondary of a current transformer is terminated by an impedance of relatively low value and the resultant secondary current opposes the flux produced by the primary current. The overall flux change in the core is theoretically zero. In practice, however, the transformer core cannot be dispensed with because of finite losses in the secondary circuit.

At low primary currents the equivalent secondary current strongly decreases due to the low value of relative magnetic permeability of the core material at low currents. This loss of sensitivity at low currents becomes even greater if the core is split to provide easy installation on existing busworks. In our new leakage current sensor accurate current ratios are obtained even at extremely low primary currents because high relative permeability (inductance) is insured even at zero primary (leakage) currents by premagnetizing the detection core with a bias current which provides an effective high relative permeability during the transformation of the leakage current. This bias current can be conducted in the detection or in a separate winding on the detection core therefore a separate bias winding is not shown in FIG. 2.

The importance of our sensitive detector is underlined by the fact that most phase to ground faults are preceded by a gradual deterioration of phase insulation. When the insulation on one phase falls below a preset value a warning signal should be given and at an even lower insulation value the network should be disconnected from its supply before an actual ground fault occurs.

With the inherent high sensitivity of our new device, which can be over a hundred times greater than that of formerly known ring type core balance transformers, the continuous monitoring of asymmetrical phase insulation becomes possible for high current busses and cables. This could not be done in such a simple and economical way before.

Increasing asymmetrical ground capacitances, however, limit the maximum length of a network to be protected by the new sensor, because asymmetrical capacitive ground currents are sensed by the detection ring as a decreased asymmetrical phase insulation.

Symmetrical deterioration of phase indulation, when each phase conductor has identical line to ground impedances, cannot be detected with our device. Since symmetrical deterioration of phase insulation is very unlikely especially at low insulation values this limitation does not seriously affect the usefulness of our sensor in most practical cases.

In summary, therefore, the present invention provides an improved leakage current sensor for a one or multiphase electric network that is unaffected by internal and external stray magnetic fluxes and comprises two shunted rings and a detection ring between them and spaced therefrom. If external magnetic flux unduly affecting the detection ring is not present the outer shunt ring of the sensor can be removed with no deterioration in the signal to noise ratio of the detected current. Each shunted ring consists of a soft magnetic core having one or more shorted turns of a conductor around it. The detection ring consists of a soft magnetic core having one or more unshunted windings which are used for current detection and biasing the detection core. Bias and detection can be combined in a single winding. The accuracy of the ratio of current transformation at low current levels is improved by applying a bias current from a high impedance source through a bias winding on the detection core. The detection and shunt rings can be split for installation without dismounting existing bus bars. The relative dimensions of the rings are governed by the required sensitivity and signal to noise ratio besides the construction and rated maximum surge current in the protected electric network.

We claim:
1. A leakage current sensor for detecting leakage currents to ground from conductors of an electrical network having one or more phases and comprising:
 a first magnetic core surrounding said conductors and having at least one conductive winding therearound for current detection;
 a second magnetic core surrounding said conductors and located in spaced relation between said first core and said conductors to shield said first core from stray fluxes therewithin,
 said second core having a shorted conductive winding therearound extending both inside and outside of said second core.
2. The subject matter of claim 1 further comprising: a third magnetic core surrounding said first core, exterior from said second core and said conductors, to shield against external stray fluxes, said third core having a shorted conductive winding therearound.
3. The subject matter of claim 1 wherein: each of said cores comprises soft magnetic material.
4. The subject matter of claim 1 wherein: said at least one conductive winding around said first core also comprises a bias current coil for premagnetization of said first core.

References Cited
UNITED STATES PATENTS

| | | | |
|---|---|---|---|
| 433,702 | 8/1890 | Tesla | 336—84 |
| 1,832,662 | 11/1931 | Schmutz | 336—175X |
| 2,466,028 | 4/1949 | Klemperer | 336—73X |

FOREIGN PATENTS

| | | | |
|---|---|---|---|
| 288,606 | 1929 | Great Britain | 336—73 |

OTHER REFERENCES

German printed application 1,086,341, Aug. 4, 1960, Lang et al.

THOMAS J. KOZME, Primary Examiner

U.S. Cl. X.R.

336—84, 175, 212